United States Patent Office 3,079,427
Patented Feb. 26, 1963

3,079,427
TERTIARY PHOSPHINE SULFIDES AND METHOD OF PREPARING SAME
Grace A. Peters, Stamford, Conn., assignor to American Cyanamid Company, New York, N.Y., a corporation of Maine
No Drawing. Filed Dec. 2, 1959, Ser. No. 856,664
7 Claims. (Cl. 260—485)

The present invention relates to new and useful organophosphorus compounds and to the preparation thereof. More particularly, the instant discovery concerns tertiary phosphine sulfides conforming to the general formula

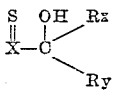

wherein Rx is H, alkyl or aryl and Ry is H, alkyl, aryl, and when taken together Rx and Ry represent the remainder of an alicyclic ring; X is a member selected from the group consisting of

and

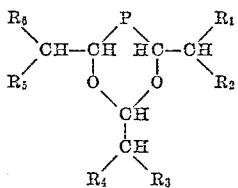

wherein Ra and Rb, respectively, represent substituted and unsubstituted, branched and straight chain saturated alkyl radicals, in which any given linear carbon chain of said radicals contains from 1 to 18 carbon atoms; substituted and unsubstituted saturated alicyclic radicals; substituted and unsubstituted aryl radicals; and Ra and Rb, respectively, are attached directly to the phosphorus atom through a carbon atom; Ra and Rb may be the same or different radicals; $R_1$ to $R_6$ represent alkyl chains of 1 to 10 carbon atoms and, as will be seen hereinafter, $R_1$, $R_2$, $R_3$, $R_4$, $R_5$ and $R_6$ may be the same or different radicals.

According to the present invention a secondary phosphine sulfide and a carbonyl compounds, i.e., a ketone or an aldehyde, are reacted to produce the corresponding tertiary phosphine sulfide

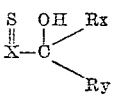

Reactions of this type are carried out, according to the present invention, at temperatures in the range of 0° C. to 200° C., preferably 15° C. to 75° C.

For instance, 2,4,6-triisopropyl-1,3-dioxa-5-phosphacyclohexane-5-sulfide is reacted with acetone according to the following equation:

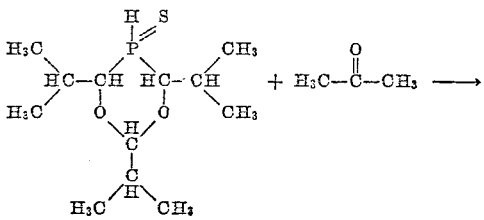

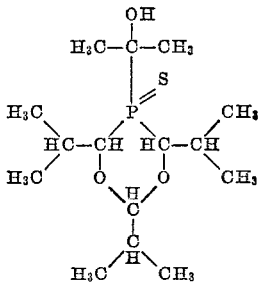

The secondary phosphine sulfides contemplated herein are those prepared according to U.S. application Serial No. 856,665, filed December 2, 1959, i.e. simultaneously herewith. As will be seen hereinafter, these sulfides are produced by reacting equimolar amounts of a secondary phosphine and sulfur in an inert atmosphere (non-oxidative) and in the presence of an inert solvent.

The 2,4,6-trisecondaryalkyl-1,3-dioxa-5-phosphacyclohexanes contemplated herein are prepared as described in copending U.S. application Serial No. 766,656, filed October 13, 1958, which is incorporated herein by reference. The 2,4,6-triisopropyl-1,3-dioxa-5-phosphacyclohexane referred to above, for example, is prepared as shown in Example A, infra.

Typical secondary phosphines suitable for preparing the corresponding secondary phosphine sulfide reactants within the purview of the instant invention are: diphenylphosphine; bis(4-chlorophenyl)phosphine; dibutylphosphine; didodecylphosphine; bis(2-phenylethyl)phosphine; dicyclohexylphosphine; bis(3-ethylhexyl)phosphine; bis-(2,4,4-trimethylpentyl)phosphine; bis(3-chloropropyl)-phosphine; bis(2-butenyl)phosphine; ethylhexylphosphine; dioctylphosphine; diisooctylphosphine; bis(3-methoxycyclohexyl)phosphine; bis(3-ethoxycyclopentenyl)-phosphine; 2,4,6-tris(3-heptyl)-1,3-dioxa-5-phosphacyclohexane; 2-(3-hexyl)-4,6-diisopropyl-1,3-dioxa-5-phosphacyclohexane; bis(2-phenoxyethyl)phosphine; bis(2-aminoethyl)phosphine; bis(2-nitropropyl)phosphine; bis(2-sulfoethyl)phosphine; bis(carbamylmethyl)phosphine; bis(2-ureidoethyl)phosphine; bis(hydroxymethyl)phosphine; bis (1-hydroxyhexyl)phosphine; bis(3-carboxypropyl)phosphine; bis(3-carbethoxypropyl)phosphine; bis(4-aminophenyl)phosphine; bis[2(4-aminophenyl)ethyl]phosphine; and the like; and mixtures thereof, such as a reactant mixture of dioctylphosphine and diisooctylphosphine, and similar mixtures.

As is evident from this list of secondary phosphines, compounds conforming to the following formula are contemplated:

wherein Ra and Rb are the same as in the product formula above.

Pursuant to U.S. application Serial No. 856,665 referred to above, a secondary phosphine of the type just defined is reacted with one molar equivalent of sulfur in the presence of an inert organic solvent, such as benzene, to produce the corresponding secondary phosphine sulfide reactant contemplated herein. Reactions of this type are carried out in an inert atmosphere, i.e., a non-oxidative atmosphere, such as in the presence of nitrogen, hydrogen, $CO_2$, and the like, and at temperatures in the range of 0° C. to 100° C., preferably 15° C. to 75° C. Preferably, the temperature employed is below the boiling point of the solvent employed.

For instance, di-n-butylphosphine is reacted as follows with sulfur under nitrogen and in the presence of benzene to produce di-n-butylphosphine sulfide:

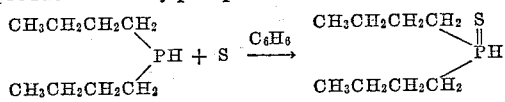

Typical inert solvents for this reaction are hydrocarbon and chlorinated hydrocarbon solvents, such as benzene, toluene, xylene, hexane, heptane, chloroform, carbon tetrachloride, dichloroethane, perchloroethylene, methylene dichloride, and the like.

According to the present invention the secondary phosphine sulfides prepared as above are reacted with a carbonyl compound, if desired in the presence of an inert organic solvent, and the resulting corresponding tertiary phosphine sulfides recovered.

Typical of these inert solvents are lower aliphatic alcohols, benzene, cyclic ethers, such as tetrahydrofuran and dioxane, and the like.

While atmospheric pressures are desirable for the reactions contemplated herein, super- and sub-atmospheric pressures are suitable.

The reactants are generally present in stoichiometric quantities, although substantially greater or substantially less than stoichiometric amounts of the phosphine or carbonyl compound are suitable without upsetting the nature of the reaction. If desired, excess carbonyl compound may serve as a solvent.

Among the many carbonyl compounds contemplated herein are acetone, cyclohexanone, acetaldehyde, formaldehyde, propionaldehyde, benzaldehyde, isobutyraldehyde, para-chlorobenzaldehyde, anisaldehyde, heptaldehyde, methyl isobutyl ketone, heptanone-2, pentanone, acetophenone, and the like. In general, reactants conforming to the general formula

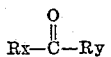

wherein $R_x$ and $R_y$ have the meaning given $R_x$ and $R_y$ above, are suitable.

The products of the present invention are useful as herbicides, and the like.

Included among the substituents contemplated for $R_a$ and $R_b$, respectively, in the formulae given above are alkoxy, halogen, aryloxy, aralkoxy, alkaryloxy, amino, nitro, ureido, sulfo, hydroxyl, carbamyl, acyloxy, carbalkoxy, carboxy, aryl, and the like.

The following example illustrates a method of preparing a typical 2,4,6-trisecondaryalkyl-1,3-dioxa-5-phosphacyclohexane secondary phosphine of the type defined above:

EXAMPLE A

2,4,6-Triisopropyl-1,3-Dioxa-5-Phosphacyclohexane

A one-liter, three-necked reactor flask is equipped with a gas inlet tube, an additional funnel, a mechanical stirrer and a gas bubbler device so disposed that all exit gases from the flask pass upwardly therethrough, the bubbler device comprising a column containing a two-inch head of water. The reactor flask is charged with a solution mixture at ambient temperature (21° C.–23° C.) of 200 milliliters of a concentrated aqueous solution of hydrochloric acid containing 37.7 percent HCl by weight and 200 milliliters of tetrahydrofuran.

Subsequently, the flask system and the charge are purged substantially free of oxygen-containing gas with nitrogen gas, and then a total of 108 grams (1.5 moles) of isobutyraldehyde and 17 grams (0.5 mole) of gaseous phosphine, at ambient temperature (21° C.–23° C.), is slowly and continuously introduced into the charge over a period of 30 minutes.

A reaction mixture results which, after settling for 30 minutes, leaves an upper organic layer or phase which is separated from the remaining reaction mixture and distilled under reduced pressure. A total of 91 grams (78 percent of theory) of product 2,4,6-triisopropyl-1,3-dioxa-5-phosphacyclohexane is thus collected as a colorless liquid having a boiling point of 100° C.–101° C. at 8 millimeters pressure. The material has a pungent odor and a refractive index of $n_D{}^{25}=1.4602$. *Analysis.*—Calculated for $C_{12}H_{25}O_2P$: C, 62.04; H, 10.85; P, 13.34. Found: C, 61.82; H, 10.78; P, 13.26.

Secondary phosphine sulfides suitable as reactants for the instant discovery may be prepared according to the following typical reactions:

EXAMPLE I

Seventy cubic centimeters of benzene and 7.5 grams (0.05 mole) of di-n-butylphosphine are admixed. To the resulting solution 1.65 grams (0.05 mole) of powdered sulfur is added under nitrogen. The resulting mixture is stirred and allowed to stand overnight. Upon removing the benzene solvent di-n-butylphosphine sulfide is recovered having the following analysis: Calculated for $C_8H_{19}PS$: C, 53.9; H, 10.75; P, 17.4; S, 18.0. Found: C, 52.33; H, 10.41; P, 17.69; S, 18.0.

EXAMPLE II

A solution of 5.0 grams (0.033 mole) of diisobutylphosphine in 50 cubic centimeters of benzene is prepared. To this solution 1.1 grams (0.033 mole) of powdered sulfur is added under nitrogen and the resulting mixture thoroughly agitated. This mixture is allowed to stand overnight and then the solvent removed. A crystalline diisobutylphosphine sulfide is recovered having the following analysis: Calculated for $C_8H_{19}PS$: C, 53.89; H, 10.74; S, 17.99. Found: C, 53.89; H, 11.06; S, 18.29.

EXAMPLE III

To a solution comprising 4.5 grams (0.0192 mole) of bis-(2-carbethoxyethyl)phosphine in 60 cubic centimeters of benzene is added under nitrogen 0.62 gram (0.0192 mole) of powdered sulfur. The resulting mixture is agitated and allowed to stand overnight. The solvent is removed and the resulting bis(2-carbethoxyethyl)phosphine sulfide recovered. *Analysis.* — Calculated for $C_{10}H_{19}PSO_4$: C, 45.10; H, 7.19; P, 11.63. Found: C, 45.26; H, 7.19; P, 11.88.

EXAMPLE IV

To a solution comprising 7.0 grams (0.03 mole) of 2,4,6-triisopropyl-1,3-dioxa-5-phosphacyclohexane in 75 cubic centimeters of benzene is added 0.96 gram (0.03 mole) of powdered sulfur under nitrogen and the resulting mixture stirred and allowed to stand overnight. Upon removal of the solvent the phosphine sulfide derivative is recovered.

EXAMPLE V

Example IV is repeated in every essential respect with the exception that 66 cubic centimeters of chloroform is substituted for the 75 cubic centimeters of benzene. As in Example IV, the corresponding phosphine sulfide product is recovered.

EXAMPLE VI–XIV

Equimolar amounts of sulfur and a secondary phosphine are reacted essentially as shown in Example I, above, the phosphines and solvents employed being given in the table below:

TABLE I

| Example | Secondary Phosphine | Solvent |
|---|---|---|
| VI | Cyclohexyl-2-cyanoethyl phosphine | $C_6H_6$ |
| VII | t-Octyl-2-cyanoethylphosphine | $C_6H_6$ |
| VIII | Diphenylphosphine | $CCl_4$ |
| IX | Bis(2-chlorophenyl)phosphine | $CH_2Cl_2$ |
| X | Methyl(isopropyl)phosphine | $CCl_4$ |
| XI | Methyl(phenyl)phosphine | $C_6H_6$ |
| XII | Bis(2-nitropropyl)phosphine | $C_6H_6$ |
| XIII | Didodecylphosphine | $C_6H_6$ |
| XIV | Bis(1-hydroxyhexyl)phosphine | $C_6H_6$ |

In each example the corresponding secondary phosphine sulfide is recovered.

The following examples illustrate the process of the present invention and the novel compounds produced thereby:

EXAMPLE XV

To a solution of 2 grams (0.112 mole) of di-n-butylphosphine sulfide in 2 cubic centimeters of benzene is added 1.2 grams (0.112 mole) of benzaldehyde. After standing overnight the mixture is stripped of solvent, leaving 2.9 grams of crystalline product. Recrystallization from heptane gives di(n-butyl)-α-hydroxybenzylphosphine sulfide having a melting point of 59° C.–62° C. *Analysis.*—Calculated: C, 63.35; H, 8.86; P, 10.89; S, 11.27. Found: C, 63.56; H, 8.98; P, 11.16; S, 11.49.

EXAMPLE XVI

Di-n-butylphosphine sulfide (3.4 grams or 0.02 mole) is dissolved in 20 cubic centimeters of benzene admixed with a 20 cubic centimeter solution of benzene containing 18 cubic centimeters of acetaldehyde, the benzene-acetaldehyde being added dropwise to the sulfide-benzene solution at 10° C.–15° C. After stirring overnight, the excess acetaldehyde and solvent are stripped leaving product di-n-butyl-1-hydroxyethyl phosphine sulfide.

EXAMPLE XVII

Equimolar amounts of a secondary phosphine sulfide and a carbonyl compound in an appropraite solvent are admixed, stirred, allowed to stand overnight and the product tertiary phosphine sulfide recovered. The following table contains the reactants, the media and the products of various runs:

TABLE II

| Example | Secondary Phosphine Sulfide | Medium | Carbonyl |
|---|---|---|---|
| XVII | t-Octyl-2-cyanoethyl-phosphine sulfide. | Bezene | Acetone. |
| XVIII | Bis (2-carbethoxyethyl) phosphine sulfide. | Dioxane | Formaldehyde. |
| XIX | 2,4,6-triisopropyl-1,3-dioxa-5-phosphacyclo-hexane-5-sulfide. | Methyl isobutyl ketone. | Methyl isobutyl ketone. |
| XX | Cyclohexyl-2-cyanoethyl-phosphine sulfide. | Tetrahydrofuran. | Cyclohexanone. |
| XXI | Diphenylphosphine sulfide | Benzene | Acetone. |
| XXII | Bis (2-chlorophenyl) phosphine sulfide. | do | Anisaldehyde. |
| XXIII | Methyl (isopropyl) phosphine sulfide. | Heptanone-2 | Heptanone-2. |
| XXIV | Methyl (phenyl) phosphine sulfide. | Benzene | Acetophenone. |

All of these runs are carried out at ambient temperature.

The products recovered after removing solvent are:

TABLE III

XVII—t-Octyl-2-cyanoethyl-1-hydroxy-1-methylethylphosphine sulfide

XVIII—Bis-(2-carbethoxyethyl-hydroxymethyl) phosphine sulfide

XIX—2,4,6-triisopropyl-1,3-dioxa-5-(1-hydroxy-1,3-dimethyl-butyl)phosphacyclohexane-5-sulfide XX—Cyclohexyl-2-cyanoethylphosphine-1-hydroxycyclohexylphosphine sulfide XXI—Diphenyl-1-hydroxy-1-methylethylphosphine sulfide XXII—Bis(2-chlorophenyl)-α-hydroxy-(p-methoxy)benzylphosphine sulfide XXIII—Methyl(isopropyl)-1-hydroxy-1-methylhexylphosphine sulfide XXIV—Methyl(phenyl)-α-hydroxy-α-methylbenzylphosphine sulfide It has been found pursuant to the instant discovery that conversion of the secondary phosphine sulfide prepared from its parent secondary phosphine, as taught herein, may be done in situ as shown below:

EXAMPLE XXV

Equimolar amounts of diphenylphosphine, sulfur and acetone are admixed in a benzene solution and allowed to stand overnight at ambient temperature with stirring. The solvent is removed by stripping and product diphenyl-1-hydroxy-1-methylethylphosphine sulfide having a melting point of 118° C.–120° C. recovered. Calculated: C, 65.19; H, 6.20; S. 11.60. Found: C, 65.11; H, 6.99; S, 11.25.

EXAMPLE XXVI

Equimolar amounts of bis(2-carbethoxyethyl)phosphine, sulfur and acetone are treated essentially as in Example XXV, above, and product bis(2-carbethoxyethyl)-1-hydroxy-1-methylethylphosphine sulfide recovered.

EXAMPLE XXVII

To a slurry of sulfur in benzene is added an equimolar (based upon S) amount of acetaldehyde. The resulting mixture is cooled and flushed with nitrogen before adding an equimolar amount (based upon sulfur and acetaldehyde) of di-n-butylphosphine at slightly below 20° C. After stirring overnight, the solvent is removed and product di-n-butyl-1-hydroxyethylphosphine sulfide recovered.

If desired, the reactions taught hereinabove may be expedited by the presence of a catalytic amount of basic organic catalyst, such as triethylamine, tributylamine, heptamethylbiguanide, pentamethylguanidine, and the like.

For example, in all the reactions of benzaldehyde and di-n-butylphosphine sulfide as in Example XV, above, the presence of 0.5 milliliter of triethylamine during reaction provides crystals in about one-third the time required when no catalyst is present.

As indicated above, the compounds contemplated herein are useful as herbicides. The following table illustrates their typical activity (percentages given in percent by weight):

TABLE IV

| 2,4,6-triisopropyl-1,3-dioxa-5-(1-hydroxy-1-methylethyl) phosphacyclohexane-5-sulfide | Radish Seeds, Percent Kill [1] | Wheat Seeds, Percen Kill [1] |
|---|---|---|
| 0.1 | 100 | 100 |

[1] Numerical percentage.

Referring to Table IV, above, about 50 seeds of each species are placed in special one ounce bottles together with 25 cubic centimeters of water containing 0.1 percent by weight of the sulfide. After 20 hours the seed are removed, water washed and allowed to germinate for 5 days. At the end of this period percent mortality is recorded.

Obviously, the various tertiary phosphine sulfides contemplated herein manifest slightly different herbicidal activity and the results given Table IV, above, are merely exemplary.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

I claim:

1. An organophosphorus compound corresponding to the formula

wherein Rx is a member selected from the group consisting of H, alkyl and aryl, Ry is a member selected from the group consisting of H, alkyl, and aryl, and Rx and Ry in combination represent the residue of an alicyclic ring; X is a member selected from the group consisting of

and

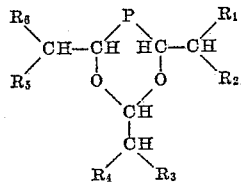

wherein Ra and Rb, respectively, represent a member selected from the group consisting of branched and straight chain alkyl; substituted branched and straight chain alkyl, in which a linear carbon chain of said substituted and unsubstituted alkyl radicals contains from 1 to 18 carbon atoms; cyclopentyl; cyclopentenyl; substituted cyclopentyl; substituted cyclopentenyl; cyclohexyl; cyclohexenyl; substituted cyclohexyl; substituted cyclohexenyl; phenyl; substituted phenyl; and said substituents for the above alkyl, phenyl, cycloalkyl and cycloalkenyl radicals are selected from the group consisting of lower alkoxy, halogen, phenoxy, amino, nitro, ureido, sulfo, hydroxyl, carbamyl, cyano, carbalkoxy (lower), phenyl and carboxy; and Ra and Rb, respectively, are attached directly to the phosphorus atom through a carbon atom; Ra and Rb may be the same radicals; Ra and Rb may be different radicals; $R_1$ to $R_6$ represent alkyl chains of 1 to 10 carbon atoms; and $R_1$, $R_2$, $R_3$, $R_4$, $R_5$ and $R_6$ may all be the same radicals; and $R_1$, $R_2$, $R_3$, $R_4$, $R_5$ and $R_6$ may be different radicals.

2. Bis(2 - carbethoxyethyl) - hydroxymethylphosphine sulfide.
3. Di-n-butyl-1-hydroxyethylphosphine sulfide.
4. Di-n - butyl-1-hydroxy-1-methylethylphosphine sulfide.
5. 2,4,6 - triisopropyl-1,3-dioxa-5-(1-hydroxy-1-methylethyl)phosphacyclohexane-5-sulfide.
6. Diphenyl - 1 - hydroxy-1-methylethylphosphine sulfide.
7. A method of preparing a tertiary phosphine sulfide which comprises bringing a secondary phosphine sulfide selected from the group consisting of

and

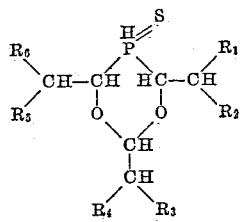

into contact with a carbonyl compound of the formula

and recovering the corresponding tertiary phosphine represented by the formula

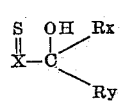

wherein Ra and Rb in the reactant formula above represent, respectively, a member selected from the group consisting of branched and straight chain alkyl; substituted branched and straight chain alkyl, in which a linear carbon chain of said substituted and unsubstituted radicals contains from 1 to 18 carbon atoms; cyclopentyl; cyclopentenyl; substituted cyclopentyl; substituted cyclopentenyl; cyclohexyl; cyclohexenyl; substituted cyclohexyl; substituted cyclohexenyl; phenyl; substituted phenyl; and said substituents for the above alkyl, phenyl, cycloalkyl and cycloalkenyl radicals are selected from the group consisting of lower alkoxy, halogen, phenoxy, amino, nitro, ureido, sulfo, hydroxyl, carbamyl, carbalkoxy (lower) phenyl and carboxy; and Ra and Rb, respectively, are attached directly to the phosphorus atom through a carbon atom; Ra and Rb may be the same radicals; Ra and Rb may be different radicals; $R_1$ to $R_6$ represent alkyl chains of 1 to 10 carbon atoms; $R_1$, $R_2$, $R_3$, $R_4$, $R_5$ and $R_6$ may all be the same radicals; and $R_1$, $R_2$, $R_3$, $R_4$, $R_5$ and $R_6$ may be different radicals; Rx in the product formula above is a member selected from the group consisting of H, alkyl and aryl; Ry is a member selected from the group consisting of H, alkyl and aryl, and Rx and Ry in combination represent the residue of an alicyclic ring; X is a member selected from the group consisting of

and

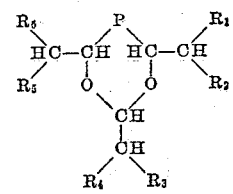

wherein Ra, Rb and $R_1$–$R_6$ are the same as above.

References Cited in the file of this patent
UNITED STATES PATENTS

| | | |
|---|---|---|
| 2,346,155 | Dennison et al. | Apr. 11, 1944 |
| 2,967,884 | Dunn et al. | Jan. 10, 1961 |

UNITED STATES PATENT OFFICE
CERTIFICATE OF CORRECTION

Patent No. 3,079,427                              February 26, 1963

Grace A. Peters

It is hereby certified that error appears in the above numbered patent requiring correction and that the said Letters Patent should read as corrected below.

Column 5, TABLE II, Example XVII, third column, line 1 thereof, for "Bezene" read -- Benzene --; same column, TABLE III, Example XVIII, for "Bis-(2-carbethoxyethyl hydroxymethyl phosphine sulfide" read -- Bis-(2-carbethoxyethyl)-hydroxymethyl phosphine sulfide --.

Signed and sealed this 17th day of December 1963.

(SEAL)
Attest:

ERNEST W. SWIDER
Attesting Officer

EDWIN L. REYNOLDS

Acting Commissioner of Patents